(12) United States Patent
Boileau

(10) Patent No.: US 9,856,826 B2
(45) Date of Patent: Jan. 2, 2018

(54) NACELLE REAR ASSEMBLY FOR A TURBOJET ENGINE COMPRISING A SUSPENSION CRADLE

(71) Applicant: SAFRAN NACELLES, Gonfreville L'Orcher (FR)

(72) Inventor: Patrick Boileau, Gonfreville L'Orcher (FR)

(73) Assignee: SAFRAN NACELLES, Gonfreville L'Orcher (FR)

( * ) Notice: Subject to any disclaimer, the term of this patent is extended or adjusted under 35 U.S.C. 154(b) by 0 days.

(21) Appl. No.: 15/654,087

(22) Filed: Jul. 19, 2017

(65) Prior Publication Data

US 2017/0321634 A1   Nov. 9, 2017

Related U.S. Application Data

(63) Continuation of application No. PCT/FR2016/050121, filed on Jan. 21, 2016.

(30) Foreign Application Priority Data

Jan. 21, 2015   (FR) ..................................... 15 50492

(51) Int. Cl.
*F02K 1/72*   (2006.01)
*F02C 7/20*   (2006.01)
(Continued)

(52) U.S. Cl.
CPC ................ *F02K 1/72* (2013.01); *B64D 27/10* (2013.01); *B64D 27/16* (2013.01); *B64D 29/06* (2013.01);
(Continued)

(58) Field of Classification Search
CPC ......... F02C 7/20; B64D 27/10; B64D 290/06; B64D 2027/262; F02K 1/72;
(Continued)

(56) References Cited

U.S. PATENT DOCUMENTS

| 2010/0107599 A1* | 5/2010 | Vauchel ................. B64D 29/08 60/226.2 |
| 2011/0062279 A1* | 3/2011 | Welch .................... B21D 39/03 244/54 |
| 2012/0124963 A1* | 5/2012 | Howe ..................... A63F 13/12 60/204 |

FOREIGN PATENT DOCUMENTS

| EP | 269018 | 1/2014 |
| FR | 2911372 | 7/2008 |

(Continued)

OTHER PUBLICATIONS

International Search Report for International Application PCT/FR2016/050121, dated Apr. 20, 2016.

*Primary Examiner* — Andrew Nguyen
(74) *Attorney, Agent, or Firm* — Burris Law, PLLC

(57) ABSTRACT

The present disclosure provides a rear nacelle assembly for a turbojet having at least one thrust reversal device to redirect air circulating from upstream to downstream in a flow path of a turbojet and a mast that connects the nacelle to a structure of an aircraft. In one form, the thrust reverser device includes a cradle having a first longeron and a second longeron extending longitudinally opposite sides of the mast. The first and second longeron each include a device for slideably guiding the cowl and the cascade. In another form, a rear portion and a front portion of the cradle connects to the mast by a rear connecting device and front connecting device, respectively, such that the cradle is adapted to follow the movements of the turbojet.

12 Claims, 3 Drawing Sheets

(51) Int. Cl.
*B64D 29/06* (2006.01)
*B64D 27/10* (2006.01)
*B64D 27/16* (2006.01)
*F02K 1/76* (2006.01)

(52) U.S. Cl.
CPC ............... *F02C 7/20* (2013.01); *F02K 1/763* (2013.01); *F05D 2220/323* (2013.01); *F05D 2260/50* (2013.01)

(58) Field of Classification Search
CPC ............. F05D 2260/50; F05D 2260/30; F05D 2240/90; F05D 2240/91
See application file for complete search history.

(56) References Cited

FOREIGN PATENT DOCUMENTS

| | | |
|---|---|---|
| FR | 2952681 | 5/2011 |
| FR | 2995637 | 3/2014 |
| FR | 3002785 | 9/2014 |
| WO | 2013160627 | 10/2013 |

\* cited by examiner

NACELLE REAR ASSEMBLY FOR A TURBOJET ENGINE COMPRISING A SUSPENSION CRADLE

CROSS-REFERENCE TO RELATED APPLICATIONS

This application is a continuation of International Application No. PCT/FR2016/050121, filed on Jan. 21, 2016, which claims priority to and the benefit of FR 15/50492 filed on Jan. 21, 2015. The disclosures of the above applications are incorporated herein by reference.

FIELD

The present disclosure relates to a nacelle rear assembly for a turbojet engine.

BACKGROUND

The statements in this section merely provide background information related to the present disclosure and may not constitute prior art.

An aircraft is generally moved by several turbojet engines each housed in a nacelle accommodating a set of auxiliary actuating devices relating to its operation and providing various functions when the turbojet engine is in operation or shut-down.

These auxiliary actuating devices comprise in particular a thrust reverser device.

A turbojet engine nacelle generally has a substantially tubular structure comprising an air inlet upstream of the turbojet engine, a mid-section intended to surround a fan of said turbojet engine, a downstream section intended to surround the combustion chamber of the turbojet engine and possibly integrating thrust reverser means, and is generally terminated by an ejection nozzle whose outlet is located downstream of the turbojet engine.

The modern nacelles are intended to accommodate a bypass turbojet engine capable of generating, via the blades of the rotating fan, a hot air flow (primary flow) and a cold air flow (secondary flow) which circulates outside the turbojet engine through an annular passage, also called flow path, formed between a fairing of the turbojet engine and an inner wall of the nacelle. The two air flows are ejected from the turbojet engine by the backside of the nacelle.

The downstream section of a nacelle for such a turbojet engine generally has an Outer Fixed Structure (OFS) and a concentric Inner Fixed Structure (IFS), surrounding a downstream section of the turbojet engine accommodating the gas generator of the turbojet engine.

The inner and outer fixed structures define the flow path intended to channel the cold air flow which circulates outside the turbojet engine.

The role of a thrust reverser, during the landing of an aircraft, is to improve the braking capability of said aircraft by redirecting forwards at least one part of the air ejected from the turbojet engine. In this phase, the thrust reverser obstructs at least one part of the flow path of the cold flow and directs this flow forwardly of the nacelle, thereby generating a counter-thrust which is added to the braking of the wheels and air brakes of the airplane.

In general, the structure of a thrust reverser comprises a cowl which is movably mounted in longitudinal translation from forth to back along a direction substantially parallel to the axis of the nacelle, between a closing position in which the cowl provides the aerodynamic continuity of the nacelle, and an opening position in which the cowl opens a passage in the nacelle.

In the case of a thrust reverser with cascade vanes, the reorientation of the air flow is performed by cascade vanes, associated to thrust reverser flaps blocking at least partially the air circulation flow path, the cowl having only a simple sliding function aiming to uncover or cover these cascade vanes.

The thrust reverser flaps, also called blocking flaps, for their part, are activated and driven by the sliding of the movable cowl until at least partially obstructing the flow path downstream of the cascades, so as to improve the reorientation of the cold air flow.

Nacelles called nacelles with O-shaped structure are known, known under the terminology "O-Duct", which have a downstream structure having a substantially peripheral single structure extending from one side of the reactor mast to the other side.

It follows that such a structure generally has a substantially peripheral single cowl which, for maintenance purposes, opens by downstream translation along the longitudinal axis of the nacelle.

For a detailed description, reference might be made to the documents FR 2 911 372 and FR 2 952 681.

Moreover, the O-duct nacelles include cascade vanes which are movably mounted in translation and capable of being retracted at least partially in the thickness of the mid-section of the nacelle and thereby overlapping the fan casing when the thrust reverser is inactive, in the direct jet position. In the thrust reversal position, the cascade vanes are displaced with the movable cowl.

In the case of a thrust reverser for an O-duct nacelle, the mast may be equipped with rails allowing the sliding of the movable cowl and the cascades.

On modern propulsion units of large dimensions and having structures of great flexibility, this configuration may induce significant stresses in the structure of the thrust reverser.

A thrust reverser device described in the document FR-A-3002785 is also known, which includes rails which are arranged on either side of the mast and which provide the sliding of the movable cowl and the cascade vanes.

This type of device has drawbacks in particular in that in case of relative displacement of the turbojet engine relative to the mast, the movable cascades, which are fastened on the mast, are likely to be subjected to torsion forces.

Indeed, in order to limit the volume of modern nacelles, in particular the radial section of the nacelles, the section of the movable cascades is limited in order to reduce their bulk, so that the inertia of the cascades and the mechanical resistance oppose thereby is reduced.

Furthermore, there is also a risk of relative displacement of the rails therebetween and of the significant geometrical variations which risk compromising the proper operation of the kinematics of the thrust reverser.

Finally, the mounting/dismounting of the propulsion unit implies dismounting all or part of the thrust reverser.

SUMMARY

The present disclosure provides a nacelle rear assembly for a turbojet engine comprising at least one thrust reverser device by redirection of an air flow circulating from upstream to downstream in a flow path of the turbojet engine and a mast (also known in the art as a pylon) designed to connect the nacelle on the structure of the aircraft, the nacelle extending longitudinally from forth to back along an axis, the thrust reverser device comprising at least:

one cowl which is movably mounted in longitudinal translation from forth to back along a direction substantially parallel to the axis of the nacelle, between a closing position in which the cowl provides the aerodynamic continuity of the nacelle, and an opening position in which the cowl opens a passage in the nacelle, and at least one sliding thrust reverser cascade which is driven by the movable cowl, between a retracted position between a fan casing and an outer envelope of the nacelle, corresponding to the closing position of the cowl, and a thrust reversal position corresponding to the opening position of the cowl, a position in which the sliding cascade is displaced downstream so as to be able to extend through said passage opened by the cowl, characterized in that it is equipped with a cradle which includes a first longeron and a second longeron which extend longitudinally on opposite sides of the mast, said longerons each carrying devices for slidably guiding the movable cowl and the sliding cascade, a rear portion of the cradle being connected on the mast by a first rear connecting device and a front portion of the cradle being connected on the turbojet engine by a second front connecting device, so that the cradle is adapted to follow the movements of the turbojet engine.

Thus, the assembly according to the present disclosure allows the thrust reverser device to follow the movements of the turbojet engine and consequently to reduce the stresses transmitted to the thrust reverser.

Advantageously, the cradle contributes to limit the torsion forces on the mast and on the thrust reverser. The cradle according to the present disclosure also allows limiting the movements of the turbojet engine.

According to another aspect, the second front connecting device is connected on the fan casing of the turbojet engine.

Thus, the assembly according to the present disclosure allows promoting the installation and the removal of the thrust reverser and of the propulsion unit.

Furthermore, the first rear connecting device of the cradle and the second front connecting device of the cradle are of the removable type for promoting the installation and the removal of the thrust reverser and the rest of the propulsion unit.

Advantageously, the first longeron and the second longeron of the cradle are connected to each other by at least one cross member designed to provide the passage of the forces (i.e. load path) between the longerons.

This feature offers an efficient mechanical strength of the cradle.

Also, the device for slidably guiding the movable cowl and the sliding cascade includes at least one first pair of guide rails of the cascade, comprising a first rail and a second rail which are arranged on opposite sides of the mast and which are designed to provide the sliding of the thrust reverser cascade.

Similarly, the device for slidably guiding the movable cowl and the sliding cascade include at least one second pair of guide rails of the cowl, comprising a first rail and a second rail which are arranged on opposite sides of the mast and which are designed to provide the sliding of the movable cowl.

According to one form of the present disclosure, the first rail of the first pair of guide rails of the cascade and the first rail of the second pair of guide rails of the cowl are aligned on the same straight line, and the second rail of the first pair of guide rails of the cascade and the second rail of the second pair of guide rails of the cowl are aligned on the same straight line.

The first longeron of the cradle includes:

a first connecting portion which is laterally delimited by a first longitudinal edge which extends in the vicinity of the mast, and by a second longitudinal edge which carries at least the first guide rail of the cascade, a second connecting portion which is laterally delimited by a first longitudinal edge which extends in the vicinity of the mast, and by a second longitudinal edge which carries the second guide rail of the cascade.

Also, each connecting portion comprises an opening which is uncovered by the movable cowl in its opening position, in order to allow the redirection of the air flow, said opening being adapted to be completely or partially obstructed as desired.

This feature allows in particular acting on the ratio between the ejection surface of the nozzle of the propulsion unit and the ejection surface of the passage uncovered by the movable cowl of the thrust reverser.

According to a variant, the nacelle has an inner fixed structure which includes islets connected on the cradle. According to another variant, the device includes at least one safety lock of unintentional non-deployment of the movable cowl.

Furthermore, the cradle has a symmetrical design along a plane of symmetry passing through the axis of the nacelle.

The present disclosure futher provides a turbojet engine nacelle, which is equipped with at least one assembly of the previously described type.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
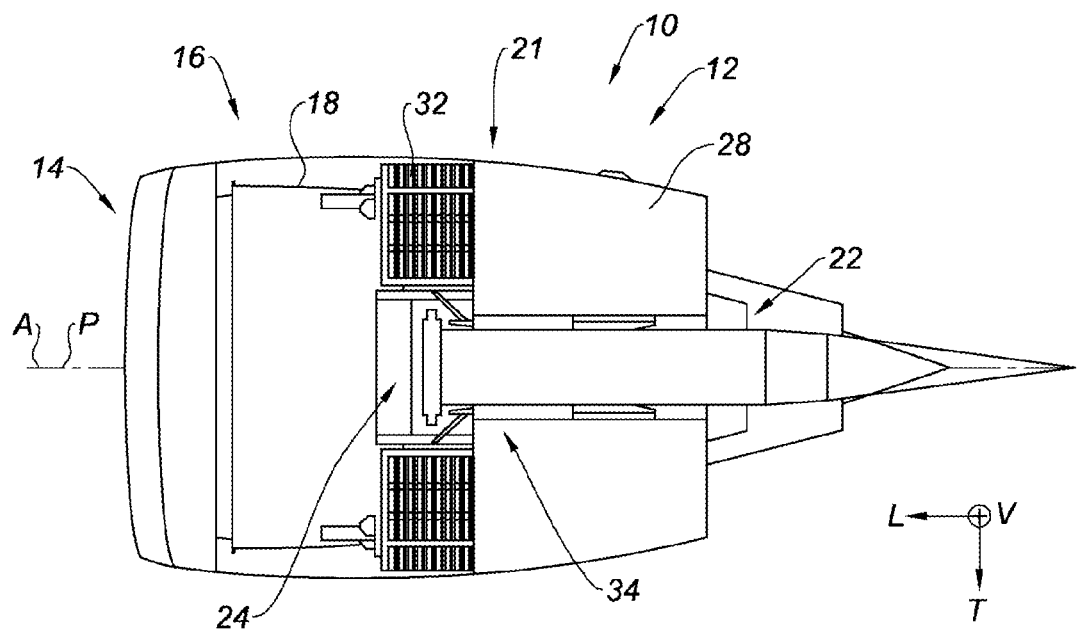
FIG. 1 is a top view of a nacelle equipped with a thrust reverser device including a cradle carrying a cowl in a closing position according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In order to clarify the description and the claims, the terminology longitudinal, vertical and transverse shall be construed without limitation with reference to the trihedron L, V, T indicated in the figures, whose longitudinal axis L is parallel to an axis of a nacelle.

It is also noteworthy that in the present disclosure, the terms "upstream" and "downstream" as used herein should be understood relative to a circulation of air flow inside a propulsion unit formed by the nacelle and a turbojet engine, that is to say from left to right according to FIGS. 1 to 5.

Furthermore, in the present disclosure, the terms "upper", "lower", "low", and "up" as used herein should be used without limitation with reference to an upper portion and a lower portion respectively according to FIGS. 1 to 5.

Also, in order to facilitate the understanding of the present disclosure, the identical and symmetrical members along the plane of symmetry P are indicated by the same numerical references distinguished by the letter "a" or "b".

There is represented in FIG. 1, a nacelle rear assembly 12 including a thrust reverser device 10 for an aircraft turbojet engine nacelle 12 (not shown) by redirecting an air flow circulating from upstream to downstream in a flow path.

Turbojet engine as used herein should be construed to include a portion or "motor" of the propulsion unit formed by the nacelle 12 and the turbojet engine, that is to say the portion which is arranged at a center of the nacelle 12.

The nacelle 12 has a substantially tubular structure which extends longitudinally along a central axis A and which comprises an air inlet 14 upstream of the turbojet engine, a mid-section 16 intended to surround a fan 18 of the turbojet engine, a downstream section 20 intended to surround a combustion chamber of the turbojet engine and integrating the thrust reverser device 10, and an ejection nozzle 21 whose outlet is located downstream of the turbojet engine.

Figure 5:
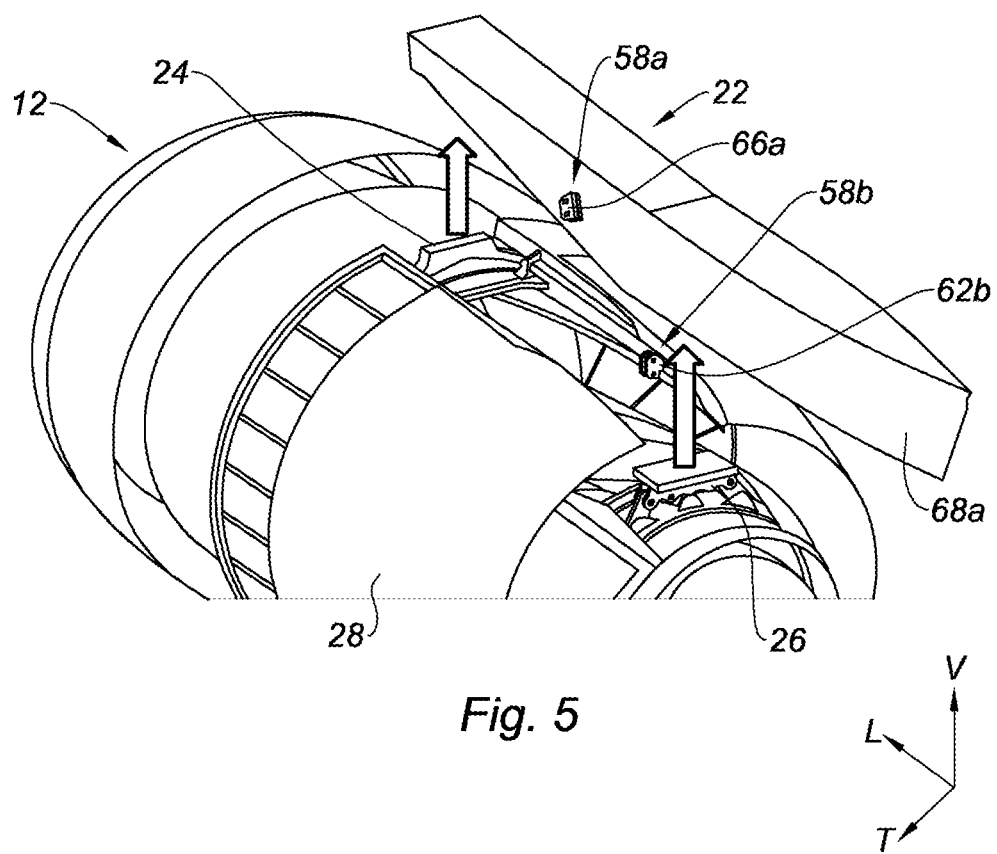
FIG. 5 is a perspective truncated overview illustrating the nacelle of FIG. 1 during mounting/dismounting on a mast of an aircraft according to the teachings of the present disclosure.

As visible in FIG. 5, the nacelle 12 is connected to a structure of the aircraft by a mast 22 which carries the turbojet engine by a first front suspension 24 fastened on a casing of the fan 18 of the turbojet engine and a second rear suspension 26.

Figure 2:
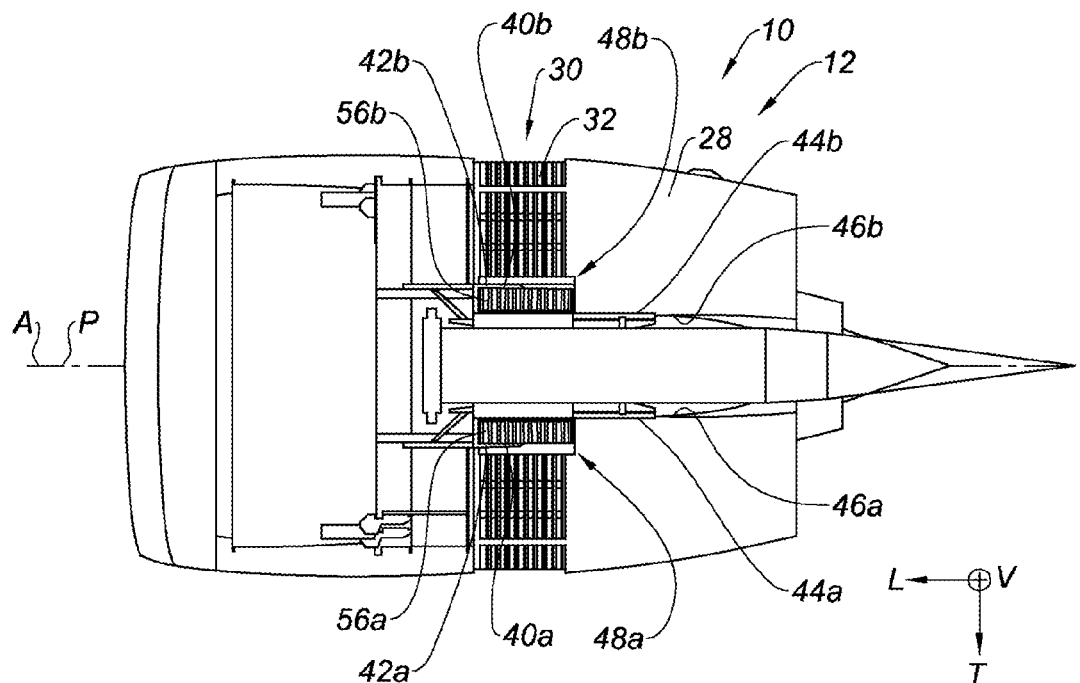
FIG. 2 is a top view of a nacelle similar to that of FIG. 1 illustrating a cowl in the opening position according to the teachings of the present disclosure.

The thrust reverser device 10 comprises a cowl 28 which is movably mounted in longitudinal translation from forth to back along the axis A of the nacelle 12, between a closing position, represented in FIG. 1, in which the cowl 28 provides the aerodynamic continuity of the nacelle 12 and an opening position, represented in FIG. 2, in which the cowl 28 opens a deflection passage 30 of the air flow in the nacelle 12.

Figure 3:
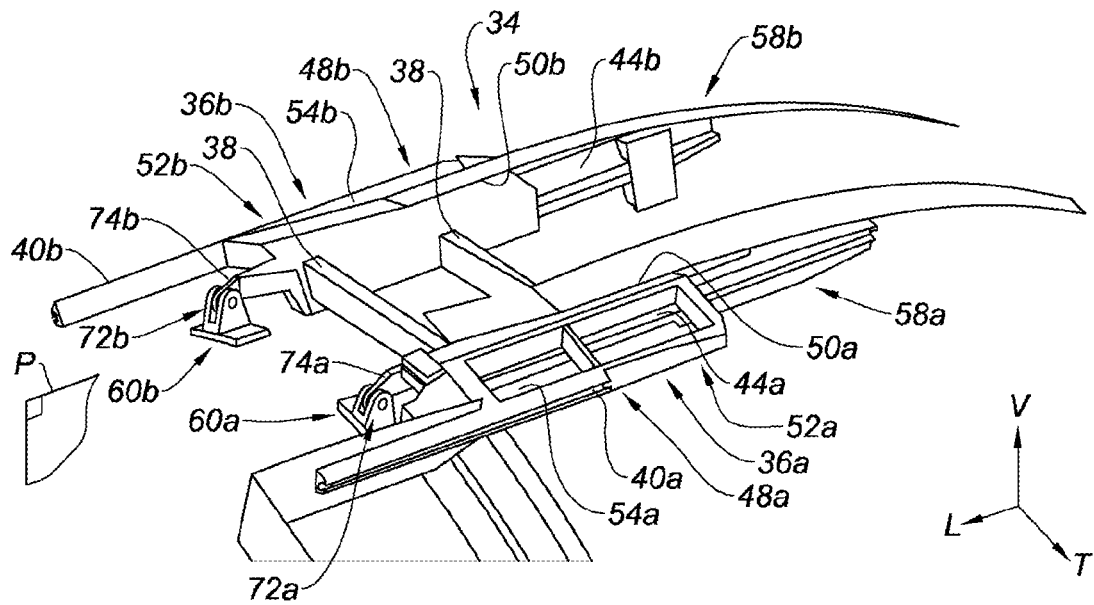
FIG. 3 is a perspective detailed view illustrating a cradle of the thrust reverser device of FIG. 1.
Figure 4:
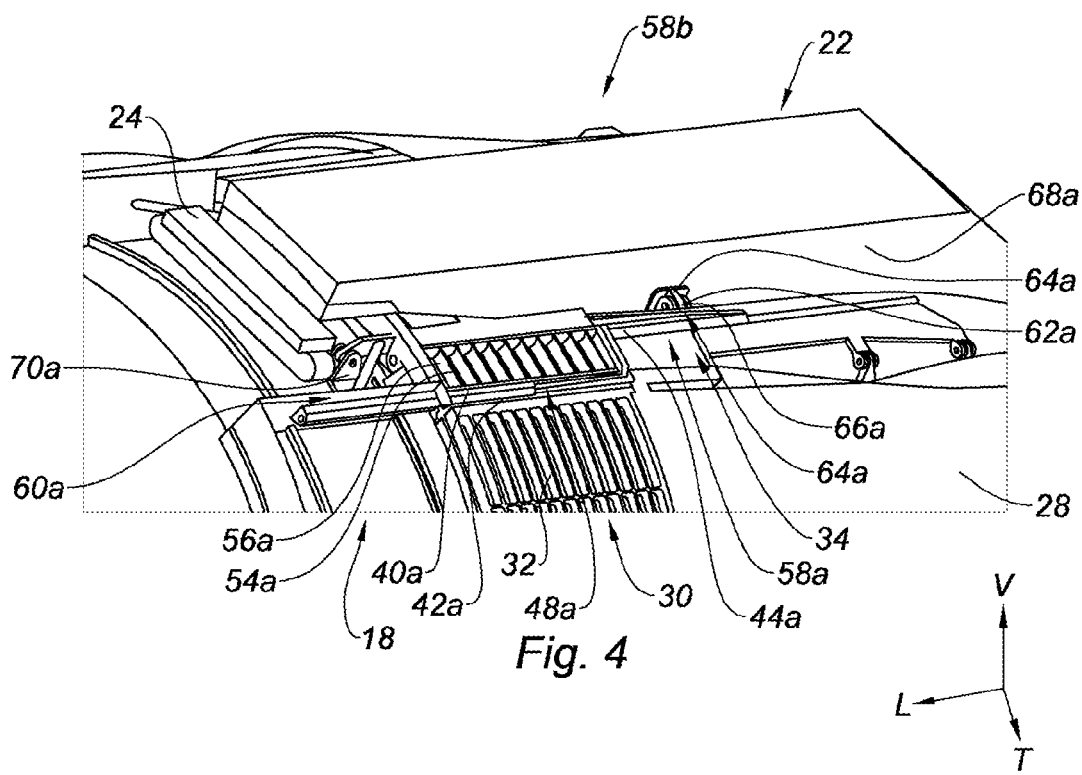
FIG. 4 is a perspective detailed view illustrating a cradle of a thrust reverser device mounted on a nacelle without a movable cowl according to the teachings of the present disclosure.

Furthermore, the device 10 includes sliding thrust reverser cascades 32 which are driven by the movable cowl 28, between a retracted position between the fan casing 18 and the outer envelope of the nacelle 12, corresponding to the closing position of the cowl 28, and a thrust reversal position corresponding to the opening position of the cowl 28, a position in which the sliding cascades 32 are displaced downstream so as to be able to extend through the passage 30 opened by the movable cowl 28 of the nacelle, In accordance with one form of the present disclosure, the nacelle rear assembly 12 is equipped with a cradle 34, represented in more details in FIGS. 3 and 4, which has a symmetrical design along a vertical plane of symmetry P passing through the longitudinal axis A of the nacelle 12.

The cradle 34 includes a first longeron 36*a* and a second longeron 36*b* which extend longitudinally on opposite sides of the mast 22, and which are connected to each other by two transverses cross members 38 designed to provide the passage of the forces (i.e. load path) between the two longerons 36*a*, 36*b*.

Without limitation, the cross members 38 may be replaced by transverse connecting rods.

The longerons 36*a*, 36*b* each include a device for slidably guiding the movable cowl 28 and the sliding cascades 32.

The sliding guide device in this form includes a first pair of guide rails of the cascades 32, the first pair of guide rails comprises a first rail 40*a* and a second rail 40*b* which extend longitudinally, which are arranged symmetrically along the plane of symmetry P, and which are designed to provide the sliding of the thrust reverser cascades 32.

To this end, with reference to FIG. 2, the cascades 32, generally C-shaped annular about the axis A of the nacelle 12, have a first guide edge 42*a* and a second guide edge 42*b* which cooperate with the first rail 40*a* and the second rail 40*b* respectively.

Furthermore, the sliding guide device includes a second pair of guide rails of the cowl 28 which comprises a first rail 44*a* and a second rail 44*b* which extend longitudinally, which are arranged symmetrically along the plane of symmetry P, and which are designed to provide the sliding of the movable cowl 28.

To this end, the movable cowl 28, generally C-shaped annular about the axis A of the nacelle 12, has a first guide edge 46*a* and a second guide edge 46*b* which cooperate with the first rail 44*a* and the second rail 44*b* respectively.

According to another form of the present disclosure, the first longeron 36*a* of the cradle 34 includes a first connecting portion 48*a* which is laterally delimited by a first longitudinal edge 50*a* which extends in the vicinity of the mast 22, and by a second longitudinal edge 52*a* which carries the first guide rail 40*a* of the sliding cascades 32.

By symmetry, the second longeron 36*b* of the cradle 34 includes a second connecting portion 48*b* which is laterally delimited by a first longitudinal edge 50*b* which extends in the vicinity of the mast 22, and by a second longitudinal edge 52*b* which carries the second guide rail 40*b* of the sliding cascades 32.

The guide rails of the cascades 32 are spaced apart transversely relative to the guide rails of the cowl 28 in order to allow the arrangement of the front suspension 24 between the guide rails of the cascades 32.

Furthermore, the guide rails of the cascades 32 may be shifted vertically also relative to the guide rails of the cowl 28.

However, when such an arrangement may not be needed, according to an unrepresented variant, the first rail 40*a* of the first pair of guide rails of the cascades 32 and the first rail 44*a* of the second pair of guide rails of the cowl 28 are aligned on the same straight line.

Similarly, by symmetry, the second rail 40*b* of the first pair of guide rails of the cascades 32 and the second rail 44*b* of the second pair of guide rails of the cowl 28 are aligned on the same straight line.

Thus, according to this variant, the guide rails of the cascades 32 and the guide rails of the cowl 28 may be made in one-piece part.

Also, each connecting portion 48*a*, 48*b* comprises an opening 54*a*, 54*b*, illustrated in FIG. 3, which is uncovered by the movable cowl 28 in its opening position, in order to allow the redirection of the air flow.

According to one form of present disclosure, illustrated in FIG. 2, each opening 54*a*, 54*b* is equipped with a fixed cascade 56*a*, 56*b* respectively, each cascade including fins designed to redirect the air flow forwardly of the nacelle 12, in order to contribute to the thrust reversal, when the movable cowl 28 occupies its opening position.

Advantageously, the fins of the fixed cascades 56a, 56b may be arranged so as to orient the air flow at a transversely inclined angle to reduce redirecting the air flow to the wing of the aircraft.

Alternatively, each opening 54a, 54b, or one of the openings 54a, 54b, may be completely or partially obstructed in order to improve the efficiency of the thrust reverser.

Indeed, by acting on the ejection surface of the openings 54a, 54b, it is possible to act on the ratio between the ejection surface of the nozzle of the propulsion unit and the ejection surface of the passage uncovered by the movable cowl 28 of the thrust reverser. This ratio is known as "area match".

According to another form of the present disclosure, illustrated in particular in FIG. 4, a rear, or downstream portion of the cradle 34 is connected on the mast 22 by a first rear connecting device 58a, 58b, and a front, or upstream portion of the cradle 34 is connected on the turbojet engine by a second front connecting device 60a, 60b, such that the cradle 34 is adapted to follow the movements of the turbojet engine.

According to one variation, the rear connecting device includes a first rear fastener 58a of the yoke type including a female portion 62a which is formed by two opposite lugs which extend transversely from a rear portion of the first longeron 36a of the cradle 34 and which delimit therebetween a transverse vertical slot 64a.

Complementarily, the first rear fastener 58a includes a male portion 66a which extends transversely from a first blank 68a of the mast 22 and which is adapted to cooperate with the complementary slot 64a provided for this purpose.

The female portion 62a and the male portion 66a of the first rear fastener 58a are fastened to each other by two longitudinal axes (not represented) which pass through the female portion 62a and the male portion 66a and which are removable in order to allow the uncoupling of the female portion 62a and the male portion 66a.

By symmetry along the plane P, the rear connecting device includes a second rear fastener 58b (partially visible in FIGS. 3 and 5) which is similar to the first rear fastener 58a, previously described.

As visible in FIG. 5, the rear fasteners 58a, 58b are arranged in the vicinity, and upstream, of the rear suspension 26 of the turbojet engine.

Also, the front connecting device include a first front fastener 60a of the yoke type which includes a female portion 70a formed of two opposite longitudinal lugs which extend vertically from the fan casing 18 and which delimit therebetween a transverse vertical slot 72a.

Complementarily, the first front fastener 60a includes a male portion 74a, forming an arm, which extends longitudinally from the front cross member 38 of the cradle 34 and which is adapted to cooperate with the complementary slot 72a provided for this purpose.

The female portion 70a and the male portion 74a of the first front fastener 60a are fastened to each other by two transverse axes (not represented) which pass through the female portion 70a and the male portion 74a and which are removable in order to allow the uncoupling of the female portion 70a and the male portion 74a.

By symmetry along the plane P, the front connecting device includes a second front fastener 60b (visible in FIGS. 3 and 5) which is similar to the first front fastener 60a, previously described.

As visible in FIG. 3, the front fasteners 60a, 60b are arranged in the vicinity, and downstream, of the front suspension 24 of the turbojet engine.

Thus, in case of movement of the turbojet engine, in particular in case of nose-up, the thrust reverser device 10 generally follows this movement of the turbojet engine, the cradle 34 accompanying the movement transmitted by the front connecting device 60a, 60b fastened on the casing of the fan 18.

This feature allows in particular the sliding cascades 32 and the movable cowl 28, as well as their guide rails 40a, 40b, 44a, 44b to follow the movement of the turbocompressor.

Also, as visible in FIG. 5, the present disclosure allows a quick and simplified installation and removal of the propulsion unit on the mast 22.

Indeed, the detachment of the front suspension 24 and of the rear suspension 26 from the turbojet engine, as well as the detachment of the rear connecting device 58a, 58b and of the front connecting device 60a, 60b from the cradle 34 are sufficient to detach the propulsion unit.

Advantageously, according to an unrepresented variant, the nacelle 12 has an inner fixed structure, which surrounds a downstream section of the turbojet engine and which includes islets connected on the cradle 34. Similarly, according to an unrepresented variant, the thrust reverser device 10 includes safety locks designed to inhibit the unintentional non-deployment of the movable cowl 28.

The present description of the present disclosure is given by way of non-limiting example.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A nacelle rear assembly for a nacelle of a turbojet engine comprising:
at least one thrust reverser configured to redirect air flow circulating from upstream to downstream in a flow path of the turbojet engine and a mast that connects the nacelle on a structure of an aircraft, the nacelle extending longitudinally from forth to back along an axis, the at least one thrust reverser comprising:
a cowl movably mounted in longitudinal translation from forth to back along a direction parallel to the axis of the nacelle, between a closing position in which the cowl provides aerodynamic continuity of the nacelle, and an opening position in which the cowl opens a passage in the nacelle, and
at least one sliding thrust reverser cascade driven by the cowl between a retracted position between a fan casing and an outer envelope of the nacelle corresponding to the closing position of the cowl, and a thrust reversal position corresponding to the opening position of the cowl, the at least one sliding thrust reverser cascade being displaced downstream so as to be able to extend through said passage opened by the cowl in the thrust reversal position; and
a cradle comprising a first longeron and a second longeron, the first and second longeron extending longitudinally on opposite sides of the mast,
wherein the first and second longerons each slidably guide the cowl and the at least one sliding thrust reverser cascade, wherein a rear portion of the cradle is connected on the mast by a first rear connecting device and a front portion of the cradle being connected on the turbojet engine by a second front connecting device, so that the cradle is adapted to follow movements of the turbojet engine.

2. The nacelle rear assembly according to claim 1, wherein the second front connecting device is connected on the fan casing of the turbojet engine.

3. The nacelle rear assembly according to claim 1, wherein the first rear connecting device of the cradle and the second front connecting device of the cradle are of a removable type for promoting installation and removal of the at least one thrust reverser and of the turbojet engine.

4. The nacelle rear assembly according to claim 1, wherein the first longeron and the second longeron of the cradle are connected to each other by at least one cross member configured to provide passage of forces between the first and second longerons.

5. The nacelle rear assembly according to claim 1, further comprising:
    one first pair of guide rails of the cascade comprising a first rail and a second rail which are arranged on opposite sides of the mast and which are configured to provide sliding of the at least one sliding thrust reverser cascade; and
    one second pair of guide rails of the cowl comprising a first rail and a second rail of the second pair of guide rails which are arranged on opposite sides of the mast and which are configured to provide sliding of the movable cowl.

6. The nacelle rear assembly according to claim 5, wherein the first rail of the first pair of guide rails and the first rail of the second pair of guide rails of the cowl are aligned on a first straight line, and the second rail of the first pair of guide rails of the cascade and the second rail of the second pair of guide rails of the cowl are aligned on a second straight line.

7. The nacelle rear assembly according to claim 5, wherein the first longeron of the cradle further includes:
    a first connecting portion laterally delimited by a first longitudinal edge that extends in a vicinity of the mast and by a second longitudinal edge that carries at least the first rail of the first pair of guide rails; and
    a second connecting portion laterally delimited by a first longitudinal edge of the second connecting portion that extends in a vicinity of the mast and by a second longitudinal edge of the second connecting portion that carries at least the second rail of the first pair of guide rails.

8. The nacelle rear assembly according to claim 7, wherein the first and second connecting portions each comprise an opening uncovered by the cowl in the opening position thereof, in order to allow redirection of air flow, said opening being adapted to be fully or partially obstructed.

9. The nacelle rear assembly according to claim 1, wherein the nacelle has a fixed inner structure having islets connected on the cradle.

10. The nacelle rear assembly according to claim 1, wherein the at least one thrust reverser further includes at least one safety lock.

11. The nacelle rear assembly according to claim 1, wherein the cradle has a symmetrical design along a plane of symmetry passing through the axis of the nacelle.

12. A turbojet engine nacelle equipped with at least one nacelle rear assembly according to claim 1.

* * * * *